United States Patent [19]

De Jager

[11] Patent Number: 5,684,255
[45] Date of Patent: Nov. 4, 1997

[54] APPARATUS FOR MEASURING YARN TENSION

[75] Inventor: Godert De Jager, Benglen, Switzerland

[73] Assignee: Sulzer Rueti AG, Rueti, Switzerland

[21] Appl. No.: 463,596

[22] Filed: Jun. 5, 1995

[30] Foreign Application Priority Data

Jun. 10, 1994 [EP] European Pat. Off. ............. 94810344

[51] Int. Cl.$^6$ .................................................. G01L 1/22
[52] U.S. Cl. ........................ 73/862.474; 139/194
[58] Field of Search ............... 73/862.391, 862.451, 73/862.471, 862.473, 862.474, 826; 139/14, 452; 194, 311

[56] References Cited

U.S. PATENT DOCUMENTS

| | | | |
|---|---|---|---|
| 3,572,110 | 3/1971 | James et al. | 73/862.473 |
| 3,613,065 | 10/1971 | Lindemann et al. | 73/862.41 X |
| 3,845,434 | 10/1974 | Carter. | |
| 4,163,126 | 7/1979 | Van Mastrigt | 73/862.471 X |
| 4,182,169 | 1/1980 | Bardy | 73/862.474 |
| 4,233,837 | 11/1980 | Canfield | 73/862.474 |
| 4,343,197 | 8/1982 | Suzuki et al.. | |
| 4,699,606 | 10/1987 | Whitley, Jr. et al. | 73/867.474 X |
| 4,883,531 | 11/1989 | Cole et al. | 73/862.474 X |
| 4,899,599 | 2/1990 | Eddens | 73/862.474 X |
| 4,914,960 | 4/1990 | Kordahi | 73/862.474 X |
| 4,992,778 | 2/1991 | McKeen et al. | 73/862.451 X |
| 5,020,381 | 6/1991 | Bartlett | 73/862.471 |

FOREIGN PATENT DOCUMENTS

| | | | |
|---|---|---|---|
| 2755311 | 6/1978 | Germany | 73/862.473 |
| 3150118 | 6/1983 | Germany. | |
| 3223054 | 12/1983 | Germany. | |

OTHER PUBLICATIONS

Patent Abstracts of Japan, vol. 7, No. 193 (M-238) Aug. 24, 1983 & JP-A-58 093 680 (Yokohama Gomu KK) Jun. 3, 1993, Abstract.

*Primary Examiner*—Elizabeth L. Dougherty
*Attorney, Agent, or Firm*—Townsend and Townsend and Crew LLP

[57] ABSTRACT

The apparatus contains a measurement unit comprising a signal transmitter (1), a yarn guidance member (2) and a resilient layer (4) arranged between the signal transmitter and the yarn guidance member and connected to them. Almost hysteresis-free operation is achieved as a result of the exposed arrangement of the layer and of the yarn guidance member.

12 Claims, 1 Drawing Sheet

APPARATUS FOR MEASURING YARN TENSION

BACKGROUND OF THE INVENTION

The invention relates to an apparatus for measuring yarn tension.

An apparatus for monitoring the yarn tension is described in DE-OS 32 23 054 which comprises a switching rail made up of a resilient plastic section and contact surfaces embedded therein as well as a foil resistant to abrasion. The yarns are guided over the plastic section with a pre-specified angle of wrap. Changes in the yarn tension deform the plastic section so that the contact surfaces touch each other. This requires a large yarn tension and, in addition, only a switch off signal is obtained.

SUMMARY OF THE INVENTION

It is an object of the invention is to provide an apparatus for measuring yarn tension which can reliably measure small tensions and, in addition, which operates almost without hysteresis.

This object is satisfied in accordance with the invention with a yarn tension measuring appartus which has at least one measurement unit having a signal transmitter, a yarn guidance member and a resillient means arranged between the signal transmitter and the yarn guidance member.

A low mass embodiment of the invention is advantageous since it results in a high sensitivity of response and allows measurements to be made at a high frequency.

BRIEF DESCRIPTION OF THE DRAWINGS

The invention is described in the following by means of example only with reference to the following figures.

DESCRIPTION OF THE PREFERRED EMBODIMENTS

Figure 1:
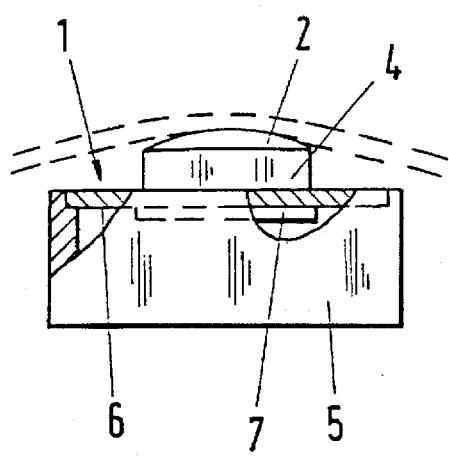
FIG. 1 shows a first embodiment of an apparatus made in accordance with the invention.
Figure 2:
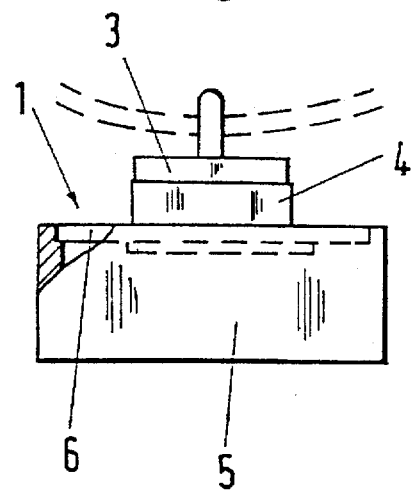
FIG. 2 shows a second embodiment of an apparatus made in accordance with the invention.

FIGS. 1 and 2 show measurement units for measuring the yarn tension for a single yarn with the yarn paths or lines being different.

The measurement unit substantially comprises a signal transmitter 1, a yarn guidance member 2, 3, a resilient layer 4 and a holder 5.

The signal transmitter 1 comprises an elastically bendable plate 6 and a number of strain measurement strips (strain guages) 7 arranged on the surface of the plate. The signal transmitter 1 is arranged in the holder 5 such that the plate surface equipped with the strain measurement strips forms the underside and the other plate surface forms the upper side which flushly closes the holder. The resilient layer 4 is made of silicone rubber which is applied to the upper side of the plate 6 and serves for force transmission. The yarn guidance member 2, 3 is made of ceramic and is placed onto the layer 4 in an exposed or free-lying arrangement. Moreover, the support surface of the layer 4 and the yarn guidance member 3 have the same dimensions. In the preferred embodiment of the measurement unit, the yarn guidance member 2 is formed in the shape of the section of a circle and has a groove (not shown) in the upper side for guiding the yarn (FIG. 1).

In the other embodiment of the measurement unit, the yarn guidance member 3 has a hook-shaped element or an eyelet (FIG. 2). It is thus possible to freely select the location at which the measurement unit is fitted.

The embodiments described above are particularly suited for measuring weft yarn tension in a weaving machine.

Figure 3:
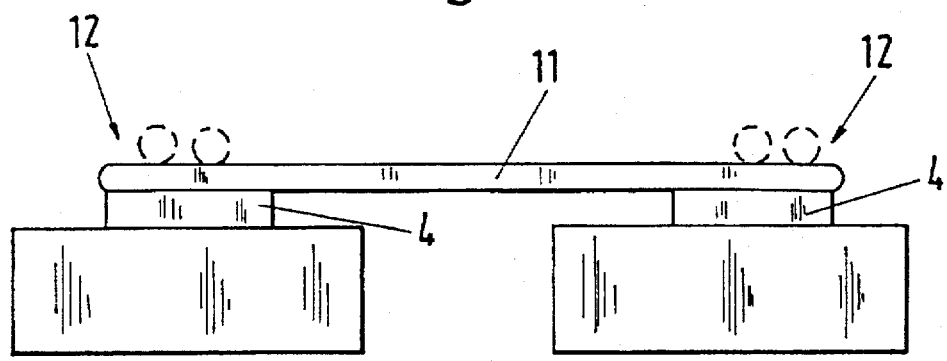
FIG. 3 shows a third embodiment of an apparatus made in accordance with the invention.

FIG. 3 shows an apparatus for measuring the yarn tension of a prespecified number of yarns. The apparatus consists of two measurement units and an elongate yarn guidance member 11 the end sections 12 of which are each connected to the layer 4 of the respective measurement unit.

Figure 4:
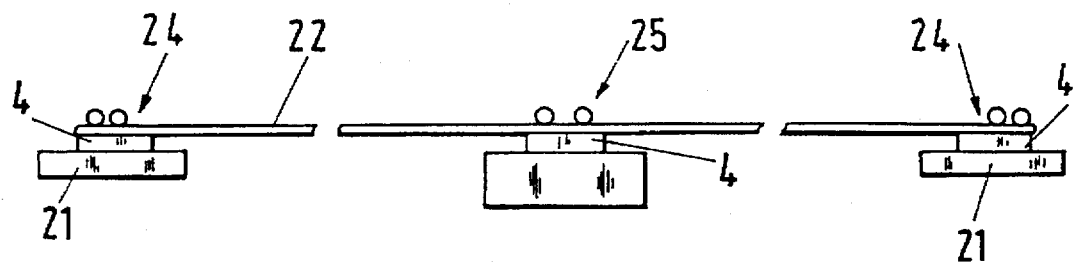
FIG. 4 shows a fourth embodiment of an apparatus made in accordance with the invention.

FIG. 4 shows an apparatus for measuring the yarn tension of a large number of yarns. The apparatus comprises a measurement unit, two supports 21 and an elongate yarn guidance member 22. The two supports 21 are each provided with a layer 4 of silicone rubber. The yarn guidance member 22 is connected at each of its end sections 24 to the respective layers 4 and at a further section 25 to the layer 4 of the measurement unit.

As is known, different articles are produced by a weaving machine. Consequently, different tensions for the weft and warp yarns result. This can be taken account of when measuring the warp yarn tension by performing the measurement with the apparatus of FIG. 3 at the edge region of the sheaf of warp strands or by performing the measurement with the apparatus of FIG. 4 over the entire sheaf of warp strands. The apparatus contains a measurement unit comprising a signal transmitter 1, a yarn guidance member 2 and a resilient layer 4 arranged between the signal transmitter and the yarn guidance member and connected to them. As a result of the exposed arrangement of the layer and of the yarn guidance member almost hysteresis-free operation is achieved.

What is claim is:

1. Apparatus for measuring yarn tension, said apparatus including at least one measurement unit having a signal transmitter, a yarn guidance member defining a surface for guiding the yarn, and a layer of an elastomeric material mounted on the signal transmitter and connected to the yarn guiding surface.

2. Apparatus in accordance with claim 1 wherein the signal transmitter comprises an elastically bendable plate and at least one measurement element connected to a surface of the plate.

3. Apparatus in accordance with claim 2 wherein the measurement element comprises one of a strain strip and a quartz piezo.

4. Apparatus in accordance with claim 1 wherein the layer of elastomeric material is selected from the group comprising silicons rubber, nitrile rubber, polyurethane and mixture thereof.

5. Apparatus in accordance with claim 1 wherein first and second measurement units are arranged at a distance from one to another, and wherein the yarn guidance member is elongated and has end sections connected to the layer of elastomeric material of the respective measurement units.

6. Apparatus in accordance with claim 1 including first and second supports each provided with an elastic layer and arranged at a distance from one another, a yarn guidance member having end sections and extending between the supports and connected to the respective elastic layers, the yarn guidance member including a further section which is spaced from the end sections, and wherein the at least one measurement unit is connected to the further section of the yarn guidance member.

7. Apparatus according to claim 1 wherein the layer of elastomeric material is positioned so that a force acting on the yarn guidance member and generated by the yarn tension is transferred to the signal transmitter via the elastomeric material layer.

8. Apparatus according to claim 7 wherein the force subjects the elastomeric material layer to one of tension and compression.

9. Apparatus for use on a weaving machine for weaving yarn into a fabric, the apparatus comprising a measurement unit including a signal transmitter and a force responsive surface operatively coupled with the transmitter for generating signals as a function of a force applied to the surface, a layer of an elastomeric material connected with the surface, and a yarn guiding member connected to a side of the layer opposite the surface for guiding the yarn past the measurement unit and arranged so that tension in the yarn generates a force which is applied to the surface via the yarn guidance member and the resilient layer, whereby the signal transmitter generates a signal indicative of the tension in the yarn.

10. Apparatus according to claim 9 including a resiliently deflectable plate defining the force responsive surface.

11. A weaving machine for weaving yarn into a fabric, the weaving machine comprising a yarn guidance surface for guiding the yarn that is to be woven, a measurement unit including a signal transmitter and a force sensing surface, and a resilient member connected to the yarn guiding surface and the force sensing surface for transmitting a force generated by the yarn and applied against the yarn guidance surface to the force sensing surface, whereby the signal transmitter emits a signal responsive to the force applied to the force sensing surface and thereby a signal representative of the tension in the yarn engaging the yarn guidance surface.

12. Apparatus measuring yarn tension including at least one measurement unit having a signal transmitter, a yarn guidance member defining a surface for guiding the yarn, and a layer of an elastomeric material mounted on the signal transmitter and connected to the yarn guiding surface and directly transmitting forces resulting from the yarn tension from the yarn guiding surface to the signal transmitter.

* * * * *